(12) United States Patent
Tie et al.

(10) Patent No.: US 8,392,710 B2
(45) Date of Patent: Mar. 5, 2013

(54) ENTITY BIDIRECTIONAL-IDENTIFICATION METHOD FOR SUPPORTING FAST HANDOFF

(75) Inventors: Manxia Tie, Shaanxi (CN); Jun Cao, Shaanxi (CN); Zhenhai Huang, Shaanxi (CN); Xiaolong Lai, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 257 days.

(21) Appl. No.: 12/994,712

(22) PCT Filed: May 27, 2009

(86) PCT No.: PCT/CN2009/072023
§ 371 (c)(1),
(2), (4) Date: Nov. 24, 2010

(87) PCT Pub. No.: WO2009/143778
PCT Pub. Date: Dec. 3, 2009

(65) Prior Publication Data
US 2011/0078438 A1    Mar. 31, 2011

(30) Foreign Application Priority Data
May 29, 2008   (CN) .......................... 2008 1 0018333

(51) Int. Cl.
*H04L 9/32*       (2006.01)
(52) U.S. Cl. ......... 713/169; 713/155; 713/172; 713/175
(58) Field of Classification Search .................. None
See application file for complete search history.

(56) References Cited

U.S. PATENT DOCUMENTS

| | | | |
|---|---|---|---|
| 7,418,596 B1 * | 8/2008 | Carroll et al. ................. | 713/169 |
| 7,529,925 B2 * | 5/2009 | Harkins ........................ | 713/155 |
| 7,577,425 B2 * | 8/2009 | Okazaki et al. ............... | 455/411 |
| 2002/0197979 A1 * | 12/2002 | Vanderveen .................. | 455/410 |
| 2006/0135141 A1 | 6/2006 | Wilson et al. | |
| 2006/0274695 A1 * | 12/2006 | Krishnamurthi et al. ..... | 370/331 |
| 2009/0310510 A1 * | 12/2009 | Corrao et al. ................. | 370/254 |

FOREIGN PATENT DOCUMENTS

| | | |
|---|---|---|
| CN | 1630405 A | 6/2005 |
| CN | 101136928 A | 3/2008 |
| CN | 101145910 A | 3/2008 |

(Continued)

*Primary Examiner* — Kaveh Abrishamkar
(74) *Attorney, Agent, or Firm* — Harness, Dickey & Pierce, P.L.C.

(57) ABSTRACT

An entity bidirectional-identification method for supporting fast handoff involves three security elements, which includes two identification elements A and B and a trusted third party (TP). All identification entities of a same element share a public key certification or own a same public key. When any identification entity in identification element A and any identification entity in identification element B need to identify each other, if identification protocol has never been operated between the two identification elements that they belong to respectively, the whole identification protocol process will be operated; otherwise, interaction of identification protocol will be acted only between the two identification entities. Application of the present invention not only centralizes management of public key and simplifies protocol operation condition, but also utilizes the concept of security domain so as to reduce management complexity of public key, shorten identification time and satisfy fast handoff requirements on the premises of guaranteeing security characteristics such as one key for every pair of identification entities, one secret key for every identification and forward secrecy.

9 Claims, 2 Drawing Sheets

FOREIGN PATENT DOCUMENTS

| | | |
|---|---|---|
| CN | 101286844 A | 10/2008 |
| JP | 63036634 A | 2/1988 |
| JP | 2001134181 A | 5/2001 |
| JP | 2003134109 A | 5/2003 |
| JP | 2003-218954 A | 7/2003 |
| JP | 2003234740 A | 8/2003 |
| JP | 2008511223 A | 4/2008 |
| WO | WO-2006021236 A1 | 3/2006 |
| WO | WO-2007030213 A2 | 3/2007 |

* cited by examiner

ENTITY BIDIRECTIONAL-IDENTIFICATION METHOD FOR SUPPORTING FAST HANDOFF

This application claims a priority to Chinese Patent Application No. 200810018333.1 filed with the Chinese Patent Office on May 29, 2008 and entitled "Mutual Entity Authentication Method Supporting Rapid Handoff", which is hereby incorporated by reference in its entirety.

FIELD OF THE INVENTION

The present invention relates to the technical field of network security, and in particular to a mutual entity authentication method supporting rapid handoff.

BACKGROUND OF THE INVENTION

Entity authentication methods adopting an asymmetric cryptographic technique are categorized into two kinds: unilateral authentication and mutual authentication. Uniqueness or timeliness of authentication is controlled by time variant parameters such as timestamps, sequence numbers, and random numbers. If the timestamps or sequence numbers are used as time variant parameters, the unilateral authentication can be completed by only one pass authentication, and the mutual authentication between entities can be completed by two pass authentication; or if random number are used as time variant parameters, the unilateral authentication can be completed by two pass authentication, and the mutual authentication can be completed by three pass authentication or four pass authentication (i.e., two parallel two pass authentication).

Before or during operation of whatever authentication mechanism, a verifier shall be provided with a public key of a claimant, otherwise the authentication might be endangered or fail. A three pass mutual authentication is described here as an example.

Referring to FIG. 1, an authentication entity A transmits a token $TokenAB=R_A\|R_B\|B\|Text3\|sS_A(R_A\|R_B\|B\|Text2)$ to an authentication entity B, and the authentication entity B transmits a token $TokenBA=R_B\|R_A\|A\|Text5\|sS_B(R_B\|R_A\|A\|Text4)$ to the authentication entity A, where X denotes an authentication entity distinguishing identifier, and the authentication system includes the two authentication entities A and B; $Cert_X$ denotes a certificate of an entity X; $sS_X$ denotes a signature of the entity X; $R_X$ denotes a random number generated by the entity X; and Text denotes an optional text field.

A process of operating the three pass authentication mechanism is described in detail below:

1) The entity B transmits a random number $R_B$ and an optional text field Text1 to the entity A;

2) The entity A transmits a token TokenAB and an optional certificate field $Cert_A$ to the entity B;

3) The entity B performs the following steps upon reception of the message transmitted from the entity A:

3.1) Guaranteeing to obtain a valid public key of the entity A either by verifying the certificate of the entity A or by some other means; and 3.2) After obtaining the public key of the entity A, verifying the signature of the entity A contained in the token TokenAB in the step 2), checking the correctness of the distinguishing identifier B, and checking that the random number $R_B$ transmitted in step 1) is consistent with the random number $R_B$ contained in the token TokenAB received in the step 2), and the entity A is therefore authenticated by the entity B;

4) The entity B transmits a token TokenBA and an optional certificate field $Cert_B$ to the entity A; and 5) The entity A performs the following steps upon reception of the message including TokenBA transmitted from the entity B:

5.1) Guaranteeing to obtain a valid public key of the entity B either by verifying the certificate of the entity B or by some other means; and 5.2) After obtaining the valid public key of the entity B, verifying the signature of the entity B contained in the token TokenBA in the step 4), checking the correctness of the distinguishing identifier A, and checking that the random number $R_A$ transmitted in the step 2) is consistent with the random number $R_A$ contained in the token TokenBA received in the step 4) and that the random number $R_B$ received in the step 1) is consistent with the random number $R_B$ contained in the token TokenBA received in the step 4), the entity B is therefore authenticated by the entity A.

As can be apparent, successful operation of the three pass authentication mechanism is guaranteed under the condition that the entity A and the entity B possess respectively the valid public keys of each other, but the protocol does not involve how to obtain the valid public keys and the validity thereof. However, this guaranteeing condition can not be satisfied in many application scenarios at present. For example, a user access control function is typically realized by the entity authentication mechanism over a communication network, and thus an access of a user to the network is prohibited before a successful operation of the authentication mechanism, and consequently it is impossible or difficult for the user to access a certificate authority and even impossible to obtain the public key of an opposite entity, i.e., a network access point, and the validity thereof prior to the authentication.

At present, mutual authentication typically has to be performed between the user and the network access point over the communication network to guarantee that the user accessing the network is legal, and thus if it is not necessary for a network entity to be aware of the valid public key of the opposite entity but instead the public key of the opposite entity is checked during authentication, then the traditional entity authentication mechanisms can both be improved and gain good feasibility and easy-to-use in practical applications. Moreover, in any of the foregoing authentication mechanisms, a device where an authentication entity resides has to perform the entire authentication protocol each time it is associated to another different device, which may give rise to the issue of whether a demand for rapid handoff can be satisfied over the communication network; and each authentication entity has to be configured with a pair of public and private keys, which may significantly complicate the management of public keys for a large network. Therefore, the protocol has to be designed to reduce the complexity of network management as much as possible while guaranteeing the authentication function to satisfy the demand for rapid handoff.

SUMMARY OF THE INVENTION

The present invention proposes a mutual entity authentication method supporting rapid handoff to address the foregoing technical problems in the prior art.

A technical solution of the present invention lies in that: the present invention provides a mutual entity authentication method supporting rapid handoff, the method involving three security elements comprising two authentication elements A and B and a Trusted third Party TP, wherein the trusted third party TP is a trusted third party of the authentication elements A and B; the authentication element A comprises n authentication entities A1, A2, ..., An, and the authentication element B comprises m authentication entities B1, B2, ..., Bm, among which synchronization information is provided; and all of the authentication entities in the same authentication element share one public key certificate or possess one public key, and for any pair of authentication entities Ai (i=1, 2, ..., n) and Bj (j=1, 2, ..., m), the authentication method comprises the steps of:

1) transmitting, by the authentication entity Bj, an authentication activation message $INI_{Bj}$ to the authentication entity Ai, wherein $INI_{Bj}=R_{Bj}\|ID_B\|Text1$, wherein $R_{Bj}$ denotes a random number generated by the authentication entity Bj, $ID_B$ denotes an identifier of the authentication element B, and Text1 denotes a first optional text;

2) transmitting, by the authentication entity Ai, an access authentication request message $AREQ_{Ai}$ to the authentication entity Bj upon reception of the authentication activation message $INI_{Bj}$, wherein $$AREQ_{Ai}=R_{Bj}\|R_{Ai}\|ID_A\|Text2\|TokenAB$$

$TokenAB=sS_A(R_{Bj}\|R_{Ai}\|ID_A\|Text2)$, wherein $R_{Ai}$ denotes a random number generated by the authentication entity Ai, $ID_A$ denotes an identifier of the authentication element A, Text2 denotes a second optional text, TokenAB denotes a token transmitted from the authentication entity Ai to the authentication entity Bj, and $sS_A$ denotes a signature of the authentication element A;

3) on receiving the access authentication request message $AREQ_{Ai}$, verifying, by the authentication entity Bj, $R_{Bj}$ in $AREQ_{Ai}$ and $R_{Bj}$ in $INI_{Bj}$ for consistency, and if $R_{Bj}$ in $AREQ_{Ai}$ is consistent with $R_{Bj}$ in $INI_{Bj}$, searching, by the authentication entity Bj, for a locally stored authentication result of the authentication element A; if there is stored an authentication result of the authentication element A, going to step 4);

4) transmitting, by the authentication entity Bj, an access authentication response message $ARES_{Bj}$ to the authentication entity Ai, and calculating a shared master key between the authentication entities Ai and Bj, wherein $$ARES_{Bj}=IRES_{TP}\|R_{Ai}\|Text5\|TokenBA$$

$TokenBA=sS_B(TokenAB\|R_{Bj}\|R_{Ai}\|Text5)$, wherein Text5 denotes a fifth optional text, $IRES_{TP}$ denotes a locally stored identity authentication response message which comprises the authentication result of the authentication element A, TokenBA denotes a token transmitted from the authentication entity Bj to the authentication entity Ai, and $sS_B$ denotes a signature of the authentication element B; and 5) verifying, by the authentication entity Ai, the access authentication response message $ARES_{Bj}$ upon reception thereof.

In the step 3), the authentication entity Bj verifies $R_{Bj}$ in $AREQ_{Ai}$ and $R_{Bj}$ in $INI_{Bj}$ for consistency upon reception of the access authentication request message $AREQ_{Ai}$, and if in case of consistency, if the authentication entity Bj fails to find a locally stored authentication result of the authentication element A, the method further comprises:

6) transmitting, by the authentication entity Bj, an identity authentication request message $IREQ_{Bj}$ to the trusted third party TP, wherein $IREQ_{Bj}=R_{Ai}\|T_{Bj}\|ID_A\|ID_B\|Text3$, wherein Text3 denotes a third optional text, and $T_{Bj}$ denotes the synchronization information generated by the authentication entity;

7) verifying, by the trusted third party TP, the authentication element A and the authentication element B for legality upon reception of the identity authentication request message $IREQ_{Bj}$;

8) returning, by the trusted third party TP, an identity authentication response message $IRES_{TP}$ to the authentication entity Bj after verifying the authentication elements A and B for legality, wherein $$IRES_{TP}=TokenTB;$$

$TokenTB=R_{Ai}\|Pub_B|T_{Bj}\|Pub_A\|Text4\|sS_{TP}$
$(R_{Ai}\|Pub_B\|T_{Bj}\|Pub_A\|Text4)$, wherein Text4 denotes a fourth optional text, TokenTB denotes a token transmitted from the trusted third party TP to the authentication entity Bj, $sS_{TP}$ denotes a signature of the trusted third party TP, $Pub_A$ denotes a verification result of the authentication element A by the trusted third party, and $Pub_B$ denotes a verification result of the authentication element B by the trusted third party, and;

9) upon reception of the identity authentication response message $IRES_{TP}$, verifying, by the authentication entity Bj, the identity authentication response message $IRES_{TP}$, storing locally the identity authentication response message $IRES_{TP}$, and forwarding the identity authentication response message $IRES_{TP}$ to other authentication entities B1, B2, ..., Bm (other than Bj) in the authentication element B after the verification is passed;

10) verifying and storing, by the authentication entities B1, B2, ..., Bm (other than Bj) in the element B, the identity authentication response message $IRES_{TP}$ upon reception thereof; and going to the step 4) to proceed with the subsequent flow.

in the step 7), if the identifiers $ID_A$ and $ID_B$ of the authentication elements A and B in the identity authentication request message $IREQ_{Bj}$ are certificates, the TP verifies the certificates $Cert_A$ and $Cert_B$ of the authentication elements A and B for validity, and if the certificates $Cert_A$ and $Cert_B$ are invalid, the TP discards directly the identity authentication request message $IREQ_{Bj}$ or returns the identity authentication response message $IRES_{TP}$; or if the certificates $Cert_A$ and $Cert_B$ are valid, the TP returns the identity authentication response message $IRES_{TP}$ and performs the step 8).

In the step 7), if the identifiers $ID_A$ and $ID_B$ of the authentication elements A and B in the identity authentication request message $IREQ_{Bj}$ are distinguishing identifiers, the TP searches for public keys $PublicKey_A$ and $PublicKey_B$ of the authentication elements A and B and verifies the validities thereof, and if no public key is found or the public keys are invalid, the TP discards directly the identity authentication request message $IREQ_{Bj}$ or returns the identity authentication response message $IRES_{TP}$; or if the public keys PublicKeyA and PublicKeyB are found and valid, the TP returns the identity authentication response message $IRES_{TP}$ and performs the step 8).

In the step 9), the authentication entity Bj verifies the identity authentication response message $IRES_{TP}$ in the following process: verifying the signature of the trusted third party TP in TokenTB, verifying $T_{Bj}$ in $IRES_{TP}$ and $T_{Bj}$ in $IREQ_{Bj}$ for consistency, and obtaining a verification result $Pub_A$ of the authentication element A after the verification is passed; and if the authentication element A is invalid, ending the process; or if the authentication element A is valid, obtaining a public key $PublicKey_A$ of the authentication element A, verifying the signature of the authentication element A in TokenAB, and if the signature is incorrect, ending the process; or if the signature is correct, storing locally the identity authentication response message $IRES_{TP}$ and forwarding the identity authentication response message $IRES_{TP}$ to other authentication entities in the authentication element B, and going to the step 10).

In the step 10), the authentication entities B1, B2, ..., Bm (other than Bj) verifies the identity authentication response message $IRES_{TP}$ in the following process: judging the freshness of the identity authentication response message $IRES_{TP}$ according to $T_{Bj}$ and local synchronization information, verifying the signature of the trusted third party TP in TokenTB, and if the signature is correct, obtaining the verification result $Pub_A$ of the authentication element A and storing locally the identity authentication response message $IRES_{TP}$.

In the step 4) the authentication entity Bj performs a Diffie-Hellman calculation from $R_{Bj}$ and $R_{Ai}$ and obtains a resultant value as the shared master key between the authentication entities Ai and Bj.

In the step 5), the authentication entity Ai verifies the access authentication response message $ARES_{Bj}$ in the following process:

verifying the signature of the trusted third party TP in TokenTB, verifying the signature of the authentication element B in TokenBA, verifying $R_{Ai}$ in the access authentication response message $ARES_{Bj}$ and $R_{Ai}$ in the access authentication request message $AREQ_{Ai}$ for consistency, and obtaining a verification result $Pub_B$ of the authentication element B after the verification is passed; if the authentication element B is invalid, failing with the authentication; or if the authentication element B is valid, obtaining a public key $PublicKey_B$ of the authentication element B and verifying the signature of the authentication element B in TokenBA, and if the signature is incorrect, failing with authentication; or if the signature is correct, performing a Diffie-Hellman calculation from $R_{Bj}$ and $R_{Ai}$ to obtain the shared master key between the authentication entities Ai and Bj, thereby completing the mutual authentication between the authentication entities Ai and Bj.

As compared with the traditional authentication mechanisms, the present invention arranges several authentication entities with adjacent spatial locations or with identical movement traces or routes of spatial locations into a security domain and takes each security domain as an authentication element during authentication; and all of the authentication entities in the same security domain share a public key certificate or possess the same public key, and the authentication entities in some security domains are provided with synchronization information. Prior to authentication, each authentication element retrieves a public key or a public key certificate of the trusted third party and retrieves a user public key certificate distributed thereto from the trusted third party or submits its own public key to the trusted third party for deposit. When two authentication entities in different security domains require to be authenticated, if no authentication protocol has ever been performed between the two security domains to which they are subordinated, then a complete authentication protocol process is performed, that is, the trusted third party searches for and verifies respective public keys of the authentication entities and validities thereof, which are then transported automatically to opposite ends desiring for them; and if the authentication protocol has been performed between the two security domains to which they are subordinated, that is, there are authentication entities in the two security domains, which have been authenticated, then the protocol process will not be performed again, that is, protocol data interaction between the authentication entities and the trusted third party can be dispensed with, and authentication will be performed only between the two authentication entities.

In contrast to the traditional authentication mechanisms, the present invention not only defines an online retrieval and authentication mechanism of public keys, achieves centralized management thereof and simplifies a condition under which the protocol is performed but also makes use of the concept of a security domain to greatly reduce the complexity of managing the public keys, shorten a period of time for authentication and facilitate satisfying a demand for rapid handoff over the network under the precondition of guaranteeing security features including a key for each pair of authentication entities, a key for each authentication thereof, forward privacy, etc.

DETAILED DESCRIPTION OF THE INVENTION

The inventive method involves three security elements, i.e., two authentication elements A and B and a Trusted third Party (TP), where the trusted third party TP is a trusted third party of the authentication elements A and B; and the authentication element A includes n authentication entities A1, A2, ..., An, the authentication element B includes m authentication entities B1, B2, ..., Bm, and among B1, B2, ..., Bm synchronization information is provided. Particularly, the synchronization information may be sequence numbers or timestamps, and here the synchronization information is timestamps by way of an example. Such a system in which peer authentication is performed between the two authentication elements A and B through the trusted third party TP is referred to a Tri-element Peer Authentication (TePA) system.

The present invention is further described in detail below in connection with embodiments thereof and with reference to the drawings to make the object, aspects and advantages thereof more apparent.

Xi denotes an authentication entity in an authentication element X; $R_{Xi}$ denotes a random number generated by the authentication entity Xi; and $T_{Xi}$ denotes synchronization information generated by the authentication entity Xi.

$Cert_X$ denotes a public key certificate of the authentication element X; $ID_X$ denotes an identifier of the authentication element X, which is represented as the certificate $Cert_X$ or as a distinguishing identifier X of the authentication element; $Valid_X$ denotes the validity of the certificate $Cert_X$; $PublicKey_X$ denotes a public key of the authentication element X; and $Pub_X$ denotes a verification result of the authentication element X, which is consisted of the certificate $Cert_X$ and the validity $Valid_X$ thereof or of the authentication element X and the public key $PublicKey_X$ thereof.

Token denotes a token field; and Text denotes an optional text field.

Figure 1:
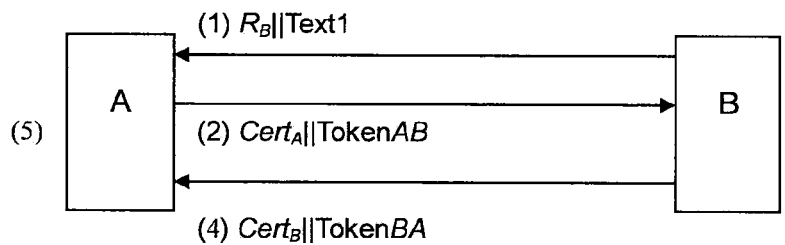
FIG. 1 is a schematic authentication diagram of a three pass authentication mechanism in the prior art.
Figure 2:
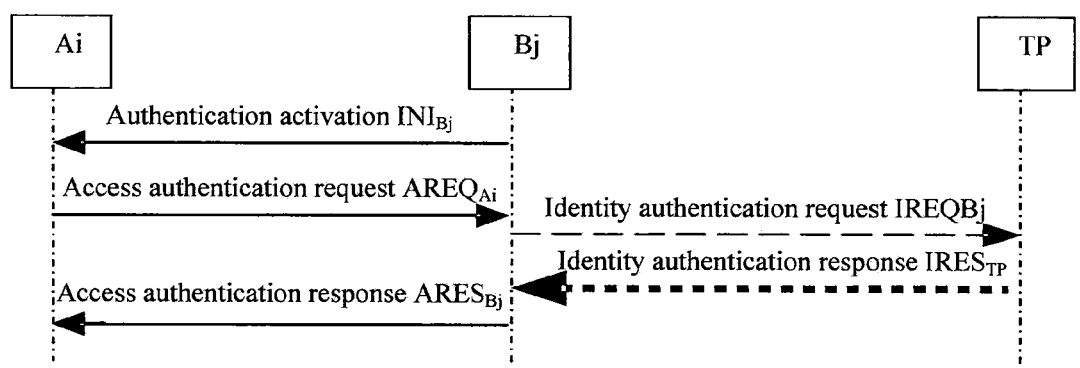
FIG. 2 is a schematic authentication diagram according to an embodiment of the present invention.

Referring to FIG. 2, an authentication process between any pair of authentication entities Ai (i=1, 2, ..., n) and Bj (j=1, 2, ..., m) involves either five messages, i.e., an authentication activation message $INI_{Bi}$, an access authentication request message $AREQ_{Ai}$, an identity authentication request message $IREQ_{Bj}$, an identity authentication response message $IRES_{TP}$ and an access authentication response message $ARES_{Bj}$, or only three messages, i.e., an authentication activation message $INI_{Bj}$, an access authentication request message $AREQ_{Ai}$ and an access authentication response message $ARES_{Bj}$.

A specific authentication process is as follows:

1) The authentication entity Bj transmits an authentication activation message $INI_{Bj}$ to the authentication entity Ai;

Where:

$INI_{Bj} = R_{Bj} \| ID_B \| Text1$

2) The authentication entity Ai transmits the access authentication request message $AREQ_{Ai}$ to the authentication entity Bj upon reception of the authentication activation message $INI_{Bj}$;

Where:

$AREQ_{Ai} = R_{Bj} \| R_{Ai} \| ID_A \| Text2 \| TokenAB$ $TokenAB = sS_A(R_{Bj} \| R_{Ai} \| ID_A \| Text2)$ 3) The authentication entity Bj receives the access authentication request message $AREQ_{Ai}$ and verifies the access authentication request message $AREQ_{Ai}$, then transmits an identity authentication request message $IREQ_{Bj}$ to the trusted third party TP, and the process goes to the step 4); or, the authentication entity Bj performs the step 8) directly;

Where:

$IREQ_{Bj} = R_{Ai} \| T_{Bj} \| ID_A \| ID_B \| Text3$;

The authentication entity Bj verifies the access authentication request message $AREQ_{Ai}$ in the following process: verifying $R_{Bj}$ in $AREQ_{Ai}$ and $R_{Bj}$ in $INI_{Bj}$ for consistency, and if the $R_{Bj}$ in $AREQ_{Ai}$ and the $R_{Bj}$ in $INI_{Bj}$ are inconsistent, directly discarding $AREQ_{Ai}$; if the $R_{Bj}$ in $AREQ_{Ai}$ and the $R_{Bj}$ in $INI_{Bj}$ are consistent, searching for a locally stored authentication result of the authentication element A, and if there is no stored authentication result of the authentication element A, transmitting the identity authentication request message $IREQ_{Bj}$ to the trusted third party TP, and going to the step 4); if there is a stored authentication result of the authentication element A, going to the step 8) directly;

4) The trusted third party TP verifies the authentication element A and the authentication element B for legality upon reception of the identity authentication request message $IREQ_{Bj}$;

Where:

If the identifiers $ID_A$ and $ID_B$ of the authentication elements A and B in the identity authentication request message $IREQ_{Bj}$ are certificates, the trusted third party TP verifies the certificates $Cert_A$ and $Cert_B$ of the authentication elements A and B for validity, and if the certificates $Cert_A$ and $Cert_B$ are invalid, the trusted third party TP discards directly the identity authentication request message $IREQ_{Bj}$ or returns an identity authentication response message $IRES_{TP}$; or if the certificates $Cert_A$ and $Cert_B$ are valid, the trusted third party TP returns an identity authentication response message $IRES_{TP}$ and goes to the step 5);

If the identifiers $ID_A$ and $ID_B$ of the authentication elements A and B in the identity authentication request message $IREQ_{Bj}$ are distinguishing identifiers, the trusted third party TP searches for public keys $PublicKey_A$ and $PublicKey_B$ of the authentication elements A and B and verifies the validities of the public keys $PublicKey_A$ and $PublicKey_B$; and if no public key is found or the public keys are invalid, the trusted third party TP discards directly the identity authentication request message $IREQ_{Bj}$ or returns an identity authentication response message $IRES_{TP}$; or if the public keys $PublicKey_A$ and $PublicKey_B$ are found and valid, the trusted third party TP returns an identity authentication response message $IRES_{TP}$ and goes to the step 5);

5) The trusted third party TP returns the identity authentication response message $IRES_{TP}$ to the authentication entity Bj after verifying the authentication entities Ai and Bj for legality;

Where:

$IRES_{TP} = TokenTB$ $TokenTB = R_{Ai} \| Pub_B \| T_{Bj} \| Pub_A \| Text4$ $\| sS_{TP}(R_{Ai} \| Pub_B \| T_{Bj} \| Pub_A \| Text4)$ 6) The authentication entity Bj receives the identity authentication response message $IRES_{TP}$ and verifies the identity authentication response message $IRES_{TP}$, then stores locally the identity authentication response message $IRES_{TP}$ while forwarding the identity authentication response message $IRES_{TP}$ to other authentication entities B1, B2, . . . , Bm (other than Bj) in the authentication element B after a verification thereof is passed;

Where:

The authentication entity Bj verifies the identity authentication response message $IRES_{TP}$ in the following process: (1) verifying the signature of the trusted third party TP in TokenTB, then verifying $T_{Bj}$ in $IRES_{TP}$ and $T_{Bj}$ in $IREQ_{Bj}$ for consistency, and thus obtaining a verification result $Pub_A$ of the authentication element A after the verification is passed; (2) If the authentication element A is invalid, ending the process; if the authentication element A is valid, retrieving the public key $PublicKey_A$ of the authentication element A, verifying the signature of the authentication element A in TokenAB, and if the signature is incorrect, ending the process; if the signature is correct, storing locally the identity authentication response message $IRES_{TP}$, forwarding the identity authentication response message $IRES_{TP}$ to other authentication entities in the authentication element B, and going to the step 7);

7) Other authentication entities B1, B2, . . . , Bm (other than Bj) in the authentication element B receive the identity authentication response message $IRES_{TP}$, verify the identity authentication response message $IRES_{TP}$, and then store locally the identity authentication response message $IRES_{TP}$ after a verification thereof is passed;

Where:

The authentication entities B1, B2, . . . , Bm (other than Bj) verify the identity authentication response message $IRES_{TP}$ in the following process: judging the freshness of the identity authentication response message $IRES_{TP}$ according to $T_{Bj}$ and local synchronization information (a timestamp) and verifying the signature of the trusted third party TP in TokenTB, and if the signature is correct, obtaining the verification result $Pub_A$ of the authentication element A and storing locally the identity authentication response message $IRES_{TP}$;

8) The authentication entity Bj transmits an access authentication response message $ARES_{Bj}$ to the authentication entity Ai and calculates a shared master key between the authentication entities Ai and Bj;

Where:

$ARES_{Bj} = IRES_{TP} \| R_{Ai} \| Text5 \| TokenBA$ $TokenBA = sS_B(TokenTB \| R_{Bj} \| R_{Ai} \| Text5)$ The authentication entity Bj performs a Diffie-Hellman calculation from $R_{Bj}$ and $R_{Ai}$ and takes a resultant value as the shared master key between the authentication entities Ai and Bj.

9) The authentication entity Ai verifies the access authentication response message $ARES_{Bj}$ upon reception thereof.

Where:

The authentication entity Ai verifies the access authentication response message $ARES_{Bj}$ in the following process: verifying the signature of the trusted third party TP in TokenTB, verifying the signature of the authentication element B in TokenBA, and verifying $R_{Ai}$ in the access authentication response message $ARES_{Bj}$ and $R_{Ai}$ in the access authentication request message $AREQ_{Ai}$ for consistency, thereby obtaining a verification result $Pub_B$ of the authentication element B after all the verifications are passed; if the authentication element B is invalid, failing with the authentication; or if the authentication element B is valid, obtaining the public key $PublicKey_B$ of the authentication element B and verifying the signature of the authentication element B in TokenBA; if the signature of the authentication element B in TokenBA is incorrect, failing with the authentication; or if the signature of the authentication element B in TokenBA is correct, performing a Diffie-Hellman calculation from $R_{Bj}$ and $R_{Ai}$ to obtain a shared master key between the authentication entities Ai and Bj, and thereby completing the mutual authentication between the authentication entities Ai and Bj.

In the event that both of the authentication elements have been authenticated mutually through the trusted third party, the authentication entities subordinated respectively to the two security domains can further require a complete authentication process to be performed in view of a local policy. If an authentication entity in the authentication element B requires a complete authentication process to be performed, the authentication entity in the authentication element B transmits an identity authentication request message to the trusted third party TP regardless of whether there is a locally stored authentication result upon reception of an access authentication request message transmitted from an opposite authentication entity; or if an authentication entity in the authentication element A requires a complete authentication process to be performed, the requirement can be identified in an optional field of the access authentication request message, and an authentication entity in the authentication element B which is opposite to the authentication entity in the authentication element A transmits an identity authentication request message to the trusted third party TP after identifying the field to perform the complete authentication process.

Figure 3:
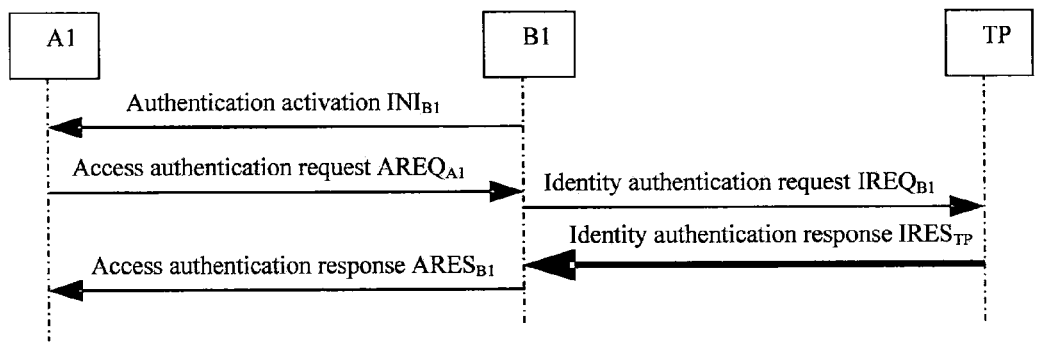
FIG. 3 is a schematic authentication diagram according to another embodiment of the present invention.

Referring to FIG. 3 and assuming the authentication entity A1 requires to be authenticated with the authentication entity B1, if no authentication process has ever been performed between the authentication elements A and B to which the authentication entities A1 and B1 are subordinated, a specific authentication flow of the entities A1 and B1 is as follows:

1) The authentication entity B1 transmits an authentication activation message $INI_{B1}$ to the authentication entity A1;

Where:

$INI_{B1}=R_{B1}\|ID_B\|Text1$

2) The authentication entity A1 transmits an access authentication request message $AREQ_{A1}$ to the authentication entity B1 upon reception of the authentication activation message $INI_{B1}$;

Where:

$AREQ_{A1}=R_{B1}\|R_{A1}\|ID_A\|Text2\|TokenAB$ $TokenAB=sS_A(R_{B1}\|R_{Ai}\|ID_A\|Text2)$ 3) The authentication entity B1 receives the access authentication request message $AREQ_{A1}$ and verifies the access authentication request message $AREQ_{A1}$, then transmits an identity authentication request message $IREQ_{B1}$ to the trusted third party TP;

Where:

$IREQ_{B1}=R_{A1}\|T_{B1}\|ID_A\|ID_B\|Text3$;

The authentication entity B1 verifies the access authentication request message $AREQ_{A1}$ in the following process: verifying $R_{B1}$ in $AREQ_{A1}$ and $R_{B1}$ in $INI_{B1}$ for consistency, and if the $R_{B1}$ in $AREQ_{A1}$ and the $R_{B1}$ in $INI_{B1}$ are consistent, transmitting the identity authentication request message $IREQ_{B1}$ to the trusted third party TP; if the $R_{B1}$ in $AREQ_{A1}$ and the $R_{B1}$ in $INI_{B1}$ are inconsistent, discarding $AREQ_{A1}$ directly;

4) The trusted third party TP verifies the authentication elements A and B for legality upon reception of the identity authentication request message $IREQ_{B1}$;

Where:

If the identifiers $ID_A$ and $ID_B$ of the authentication elements A and B in the identity authentication request message $IREQ_{B1}$ are certificates, the trusted third party TP verifies the certificates $Cert_A$ and $Cert_B$ of the authentication elements A and B for validity, and if the certificates $Cert_A$ and $Cert_B$ are invalid, the trusted third party TP discards directly the identity authentication request message $IREQ_{B1}$ or returns an identity authentication response message $IRES_{TP}$; or if the certificates $Cert_A$ and $Cert_B$ are valid, the trusted third party TP returns an identity authentication response message $IRES_{TP}$ and goes to the step 5);

If the identifiers $ID_A$ and $ID_B$ of the authentication elements A and B in the identity authentication request message $IREQ_{B1}$ are distinguishing identifiers, the trusted third party TP searches for public keys $PublicKey_A$ and $PublicKey_B$ of the authentication elements A and B and verifies the validities of the public keys $PublicKey_A$ and $PublicKey_B$, and if no public key is found or the public keys are invalid, the trusted third party TP discards directly the identity authentication request message $IREQ_{B1}$ or returns an identity authentication response message $IRES_{TP}$; or if the public keys $PublicKey_A$ and $PublicKey_B$ are found and valid, the trusted third party TP returns an identity authentication response message $IRES_{TP}$ and goes to the step 5);

5) The trusted third party TP returns the identity authentication response message $IRES_{TP}$ to the authentication entity B1 after verifying the authentication elements A and B for legality;

Where:

$IRES_{TP}=TokenTB$ $TokenTB=R_{A1}\|Pub_B\|T_{B1}\|Pub_A\|Text4$ $\|sS_{TP}(R_{A1}\|Pub_B\|T_{B1}\|Pub_A\|Text4)$ 6) The authentication entity B1 receives the identity authentication response message $IRES_{TP}$, verifies the identity authentication response message $IRES_{TP}$, and then stores locally the identity authentication response message $IRES_{TP}$ while forwarding the identity authentication response message $IRES_{TP}$ to other authentication entities B2, B3, . . . , Bm in the authentication element B after verification thereof is passed;

Where:

The authentication entity B1 verifies the identity authentication response message $IRES_{TP}$ in the following process: (1) verifying the signature of the trusted third party TP in TokenTB, verifying $T_{B1}$ in $IRES_{TP}$ and $T_{B1}$ in $IREQ_{B1}$ for consistency, and then obtaining a verification result $Pub_A$ of the authentication element A after the verification is passed; (2) if the authentication element A is invalid, ending the process; or if the authentication element A is valid, obtaining the public key PublicKey$_A$ of the authentication element A, and verifying the signature of the authentication element A in TokenAB; if the signature is incorrect, ending the process ends; or if the signature is correct, storing locally the identity authentication response message IRES$_{TP}$, forwarding the identity authentication response message IRES$_{TP}$ to other authentication entities in the authentication element B, and going to the step 7);

7) Other authentication entities B2, B3, . . . , Bm in the authentication element B receive the identity authentication response message IRES$_{TP}$, and verify the identity authentication response message IRES$_{TP}$, and then store locally the identity authentication response message IRES$_{TP}$ after a verification thereof is passed;

Where:

The authentication entities B2, B3, . . . , Bm verify the identity authentication response message IRES$_{TP}$ in the following process: judging the freshness of the identity authentication response message IRES$_{TP}$ according to T$_{B1}$ and local synchronization information (a timestamp) and verifying the signature of the trusted third party TP in TokenTB; if the verification is passed, obtaining a verification result Pub$_A$ of the authentication element A and storing locally the identity authentication response message IRES$_{TP}$; or if the verification is not passed, discarding directly the identity authentication response message IRES$_{TP}$;

8) The authentication entity B1 transmits an access authentication response message ARES$_{B1}$ to the authentication entity A1 and calculates a shared master key between the authentication entities A1 and B1;

Where:

$ARES_{B1}=IRES_{TP}\|R_{A1}\|Text5\|TokenBA$ $TokenBA=sS_B(TokenTB\|R_{B1}\|R_{A1}\|Text5)$ The authentication entity B1 performs a Diffie-Hellman calculation from R$_{B1}$ and R$_{A1}$ and takes a resultant value as the shared master key between the authentication entities A1 and B1.

9) The authentication entity A1 verifies the access authentication response message ARES$_{B1}$ upon reception thereof.

Where:

The authentication entity A1 verifies the access authentication response message ARES$_{B1}$ in the following process: verifying the signature of the trusted third party TP in TokenTB, verifying the signature of the authentication element B in TokenBA, and verifying R$_{A1}$ in the access authentication response message ARES$_{B1}$ and R$_{A1}$ in the access authentication request message AREQ$_{A1}$ for consistency, and thereby obtaining a verification result Pub$_B$ of the authentication element B after the verification is passed; if the authentication element B is invalid, failing with the authentication; or if the authentication element B is valid, the public key PublicKey$_B$ of the authentication element B and verifying the signature of the authentication element B in TokenBA, and if the signature is incorrect, failing with the authentication; or if the signature is correct, performing a Diffie-Hellman calculation from R$_{B1}$ and R$_{A1}$ to obtain a shared master key between the authentication entities A1 and B1, thereby completing the mutual authentication between the authentication entities A1 and B1.

Figure 4:
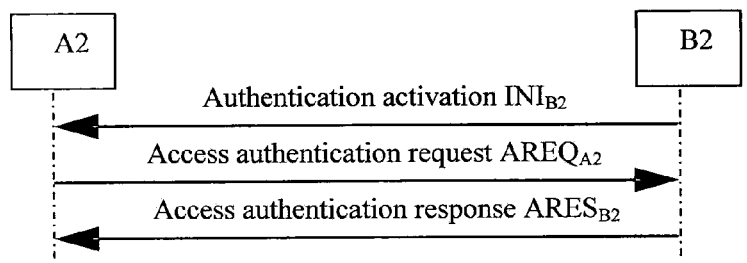
FIG. 4 is a schematic authentication diagram according to a further embodiment of the present invention.

Referring to FIG. 4, an authentication is required between another pair of entities after the authentication of authentication entities A1 and B1, and if a mutual authentication between the authentication entity A2 and the authentication entity B needs to be performed, a specific authentication flow thereof is as follows:

1) The authentication entity B2 transmits an authentication activation message INI$_{B2}$ to the authentication entity A2;

Where:

$INI_{B2}=R_{B2}\|ID_B\|Text1$

2) The authentication entity A2 transmits an access authentication request message AREQ$_{A2}$ to the authentication entity B2 upon reception of the authentication activation message INI$_{B2}$;

Where:

$AREQ_{A2}=R_{B2}\|R_{A2}\|ID_A\|Text2\|TokenAB$ $TokenAB=sS_A(R_{B2}\|R_{A2}\|ID_A\|Text2)$ 3) The authentication entity B2 receives the access authentication request message AREQ$_{A2}$, verifies the access authentication request message AREQ$_{A2}$ in connection with a locally stored authentication result of the authentication element A, transmits an access authentication response message ARES$_{B2}$ to the authentication entity A2, and calculates a shared master key between the authentication entities A2 and B2;

Where:

The authentication entity B2 verifies the access authentication request message AREQ$_{A2}$ in the following process: (1) verifying R$_{B2}$ in AREQ$_{A2}$ and R$_{B2}$ in INI$_{B2}$ for consistency; and (2) if the authentication entity B2 locally stores the authentication result of the authentication element A indicating legal validity, verifying the signature of the authentication element A in TokenAB for correctness according to the public key PublicKeyA of the authentication element A;

$ARES_{B2}=IRES_{TP}\|R_{A2}\|Text5\|TokenBA$ $TokenBA=sS_B(TokenTB\|R_{B2}\|R_{A2}\|Text5)$ IRES$_{TP}$ denotes an identity authentication response message stored locally at the authentication entity B2, which includes the authentication result of the authentication element A.

The authentication entity B2 performs a Diffie-Hellman calculation from R$_{B2}$ and R$_{A2}$ and takes a resultant value as the shared master key between the authentication entities A2 and B2;

4) The authentication entity A2 verifies the access authentication response message ARES$_{B2}$ upon reception thereof.

Where:

The authentication entity A2 verifies the access authentication response message ARES$_{B2}$ in the following process: verifying the signature of the trusted third party TP in TokenTB, verifying the signature of the authentication element B in TokenBA, and verifying R$_{A2}$ in the access authentication response message ARES$_{B2}$ and R$_{A2}$ in the access authentication request message AREQ$_{A2}$ for consistency, and thereby obtaining a verification result Pub$_B$ of the authentication element B after the verification is passed; if the authentication element B is invalid, failing with the authentication; or if the authentication element B is valid, obtaining the public key PublicKey$_B$ of the authentication element B and verifying the signature of the authentication element B in TokenBA, and if the signature is incorrect, failing with the authentication; or if the signature is correct, performing a Diffie-Hellman calculation from R$_{B2}$ and R$_{A2}$ to obtain a shared master key between the authentication entities A2 and B2, thereby completing the mutual authentication between the authentication entities A2 and B2.

The inventive method not only accomplishes mutual identity authentication between authentication entities but also guarantees the uniqueness and freshness of a master key which each pair of entities negotiate each time, and the master key is forward private. For the two security domains A and B, as in a traditional method, a public key certificate or a public key is distributed to each authentication entity, and a trusted third party TP manages n×m user certificates or public keys; if the authentication between each authentication entity in the security domain A and each authentication entity in the security domain B needs to be performed, 5×n×m messages have to be exchanged. With the inventive method, the trusted third party TP manages only two user certificates or public keys, and a minimum number of 3×n×m+2 messages need to be exchanged for authentication between respective two ones. As can be apparent, the present invention can significantly reduce the complexity of network management, improve the efficiency of performing the protocol and satisfy a handoff demand under the precondition of guaranteeing security.

The foregoing description is merely of the preferred embodiments of the present invention, and it shall be noted that those ordinarily skilled in the art can further make various modifications and variations without departing the principle of the present invention and that these modifications and variations shall also be deemed falling into the scope of the present invention.

The invention claimed is:

1. A mutual entity authentication method supporting rapid handoff, the method involving three security elements comprising two authentication elements A and B and a Trusted third Party TP, wherein the trusted third party TP is a trusted third party of the authentication elements A and B; the authentication element A comprises n authentication entities A1, A2, ..., An, and the authentication element B comprises m authentication entities B1, B2, ... Bm, among which synchronization information is provided; and all of the authentication entities in the same authentication element share one public key certificate or possess one public key, and for any pair of authentication entities Ai (i=1, 2, ..., n) and Bj (j=1, 2, ..., m), the authentication method comprises the steps of:

1) transmitting, by the authentication entity Bj, an authentication activation message $INI_{Bj}$ to the authentication entity Ai, wherein $INI_{Bj}=R_{Bj}\|ID_B\|Text1$, wherein $R_{Bj}$ denotes a random number generated by the authentication entity Bj, $ID_B$ denotes an identifier of the authentication element B, and Text1 denotes a first optional text;

2) transmitting, by the authentication entity Ai, an access authentication request message $AREQ_{Ai}$ to the authentication entity Bj upon reception of the authentication activation message $INI_{Bj}$, wherein $AREQ_{Ai}=R_{Bj}\|R_{Ai}\|ID_A\|Text2\|TokenAB$ TokenAB=$sS_A(R_{Bj}\|Text2)$, wherein $R_{Ai}$ denotes a random number generated by the authentication entity Ai, $ID_A$ denotes an identifier of the authentication element A, Text2 denotes a second optional text, TokenAB denotes a token transmitted from the authentication entity Ai to the authentication entity Bj, and $sS_A$ denotes a signature of the authentication element A;

3) on receiving the access authentication request message $AREQ_{Ai}$, verifying, by the authentication entity Bj, $R_{Bj}$ in $AREQ_{Ai}$ and $R_{Bj}$ in $INI_{Bj}$ for consistency, and if $R_{Bj}$ in $AREQ_{Ai}$ is consistent with $R_{Bj}$ in $INI_{Bj}$, searching, by the authentication entity Bj, for a locally stored authentication result of the authentication element A; if there is stored an authentication result of the authentication element A, going to step 4);

4) transmitting, by the authentication entity Bj, an access authentication response message $ARES_{Bj}$ to the authentication entity Ai, and calculating a shared master key between the authentication entities Ai and Bj, wherein $ARES_{Bj}=IRES_{TP}\|R_{Ai}\|Text5\|TokenBA$ TokenBA=$sS_B(TokenAB\|R_{Bj}\|Text5)$, wherein Text5 denotes a fifth optional text, $IRES_{TP}$ denotes an identity authentication response message stored locally at the authentication entity Bj which comprises the authentication result of the authentication element A, TokenBA denotes a token transmitted from the authentication entity Bj to the authentication entity Ai, and $sS_B$ denotes a signature of the authentication element B; and 5) verifying, by the authentication entity Ai, the access authentication response message $ARES_{Bj}$ upon reception thereof.

2. The method according to claim 1, wherein the authentication entity Bj verifies $R_{Bj}$ in $AREQ_{Ai}$ and $R_{Bj}$ in $INI_{Bj}$ for consistency upon reception of the access authentication request message $AREQ_{Ai}$, and if in case of consistency, if the authentication entity Bj fails to find a locally stored authentication result of the authentication element A, the method further comprises:

6) transmitting, by the authentication entity Bj, an identity authentication request message $IREQ_{Bj}$ to the trusted third party TP, wherein $IREQ_{Bj}=R_{Ai}\|T_{Bj}\|ID_A\|ID_B\|Text3$, wherein Text3 denotes a third optional text;

7) verifying, by the trusted third party TP, the authentication element A and the authentication element B for legality upon reception of the identity authentication request message $IREQ_{Bj}$;

8) returning, by the trusted third party TP, an identity authentication response message $IRES_{TP}$ to the authentication entity Bj after verifying the authentication elements A and B for legality, wherein $IRES_{TP}=TokenTB$;

TokenTB=$R_{Ai}\|Pub_B\|T_{Bj}\|Pub_A\|Text4\|sS_{TP}$ $(R_{Ai}\|Pub_B\|T_{Bj}\|Pub_A\|Text4)$, wherein TokenTB denotes a token transmitted from the trusted third party TP to the authentication entity Bj, $sS_{TP}$ denotes a signature of the trusted third party TP, $Pub_B$ denotes a verification result of the authentication element B by the trusted third party, $T_{Bj}$ denotes synchronization information generated by the authentication entity Bi, $Pub_A$ denotes a verification result of the authentication element A by the trusted third party, and Text4 denotes a fourth optional text;

9) upon reception of the identity authentication response message $IRES_{TP}$, verifying, by the authentication entity Bj, the identity authentication response message $IRES_{TP}$, storing locally the identity authentication response message $IRES_{TP}$, and forwarding the identity authentication response message $IRES_{TP}$ to other authentication entities B1, B2, ..., Bm (other than Bj) in the authentication element B after the verification is passed;

10) verifying and storing, by the authentication entities B1, B2, ..., Bm (other than Bj) in the authentication element B, the identity authentication response message $IRES_{TP}$ upon reception thereof; and going to the step 4) to proceed with the subsequent flow.

3. The mutual entity authentication method supporting rapid handoff according to claim 2, wherein in the step 7), if the identifiers $ID_A$ and $ID_B$ of the authentication elements A and B in the identity authentication request message $IREQ_{Bj}$ are certificates, the TP verifies the certificates $Cert_A$ and $Cert_B$ of the authentication elements A and B for validity, and if the certificates $Cert_A$ and $Cert_B$ are invalid, the TP discards directly the identity authentication request message $IREQ_{Bj}$ or returns the identity authentication response message $IRES_{TP}$; or if the certificates $Cert_A$ and $Cert_B$ are valid, the TP returns the identity authentication response message $IRES_{TP}$ and performs the step 8).

4. The mutual entity authentication method supporting rapid handoff according to claim 2, wherein in the step 7), if the identifiers $ID_A$ and $ID_B$ of the authentication elements A and B in the identity authentication request message $IREQ_{Bj}$ are distinguishing identifiers, the TP searches for public keys PublicKeyA and PublicKeyB of the authentication elements A and B and verifies the validities thereof, and if no public key is found or the public keys are invalid, the TP discards directly the identity authentication request message $IREQ_{Bj}$ or returns the identity authentication response message $IRES_{TP}$; or if the public keys PublicKeyA and PublicKeyB are found and valid, the TP returns the identity authentication response message $IRES_{TP}$ and performs the step 8).

5. The mutual entity authentication method supporting rapid handoff according to claim 3, wherein in the step 9), the authentication entity Bj verifies the identity authentication response message $IRES_{TP}$ in the following process: verifying the signature of the trusted third party TP in TokenTB, verifying $T_{Bj}$ in $IRES_{TP}$ and $T_{Bj}$ in $IREQ_{Bj}$ for consistency, and obtaining a verification result $Pub_A$ of the authentication element A after the verification is passed; and if the authentication element A is invalid, ending the process; or if the authentication element A is valid, obtaining a public key $PublicKey_A$ of the authentication element A, verifying the signature of the authentication element A in TokenAB, and if the signature is incorrect, ending the process; or if the signature is correct, storing locally the identity authentication response message $IRES_{TP}$ and forwarding the identity authentication response message $IRES_{TP}$ to other authentication entities in the authentication element B, and going to the step 10).

6. The mutual entity authentication method supporting rapid handoff according to claim 5, wherein in the step 10), the authentication entities B1, B2, . . . Bm (other than Bj) verifies the identity authentication response message $IRES_{TP}$ in the following process: judging the freshness of the identity authentication response message $IRES_{TP}$ according to $T_{BJ}$ and local synchronization information, verifying the signature of the trusted third party TP in TokenTB, and if the signature is correct, obtaining the verification result $Pub_A$ of the authentication element A and storing locally the identity authentication response message $IRES_{TP}$.

7. The mutual entity authentication method supporting rapid handoff according to claim 6, wherein in the step 4) the authentication entity Bj performs a Diffie-Hellman calculation from $R_{BJ}$ and $R_{AI}$ and obtains a resultant value as the shared master key between the authentication entities Ai and Bj.

8. The mutual entity authentication method supporting rapid handoff according to claim 7, wherein in the step 5), the authentication entity Ai verifies the access authentication response message $ARES_{Bj}$ in the following process:

verifying the signature of the trusted third party TP in TokenTB, verifying the signature of the authentication element B in TokenBA, verifying $R_{AI}$ in the access authentication response message $ARES_{Bj}$ and $R_{AI}$ in the access authentication request message $AREQ_{Ai}$ for consistency, and obtaining a verification result $Pub_B$ of the authentication element B after the verification is passed; if the authentication element B is invalid, failing with the authentication; or if the authentication element B is valid, obtaining a public key $PublicKey_B$ of the authentication element B and verifying the signature of the authentication element B in TokenBA, and if the signature is incorrect, failing with authentication; or if the signature is correct, performing a Diffie-Hellman calculation from $R_{Bj}$, and $R_{Ai}$ to obtain the shared master key between the authentication entities Ai and Bj, thereby completing the mutual authentication between the authentication entities Ai and Bj.

9. The mutual entity authentication method supporting rapid handoff according to claim 4, wherein in the step 9), the authentication entity Bj verifies the identity authentication response message $IRES_{TP}$ in the following process: verifying the signature of the trusted third party TP in TokenTB, verifying $T_{Bj}$ in $IRES_{TP}$ and $T_{Bj}$ in $IREQ_{Bj}$ for consistency, and obtaining a verification result $Pub_A$ of the authentication element A after the verification is passed; and if the authentication element A is invalid, ending the process; or if the authentication element A is valid, obtaining a public key $PublicKey_A$ of the authentication element A, verifying the signature of the authentication element A in TokenAB, and if the signature is incorrect, ending the process; or if the signature is correct, storing locally the identity authentication response message $IRES_{TP}$ and forwarding the identity authentication response message $IRES_{TP}$ to other authentication entities in the authentication element B, and going to the step 10).

* * * * *